United States Patent Office 3,274,215
Patented Sept. 20, 1966

3,274,215
MONOALKYL ADIPATE-4-LACTONES BY ALCOHOLYSIS OF 1,4-DICYANOBUTENE-1
Norman Eugene West, Vienna, W. Va., assignor to E. I. du Pont de Nemours and Company, Wilmington, Del., a corporation of Delaware
No Drawing. Filed Aug. 9, 1963, Ser. No. 301,175
8 Claims. (Cl. 260—343.6)

This invention relates to a process for the preparation of monoalkyl adipate-4-lactones from 1,4-dicyanobutene-1 by alcoholysis under acidic conditions.

Monomethyl adipate-4-lactone has been prepared by J. A. Elvidge et al. (Journal of the Chemical Society, 1950, 2213) starting with cis-cis muconic acid illustrated as follows:

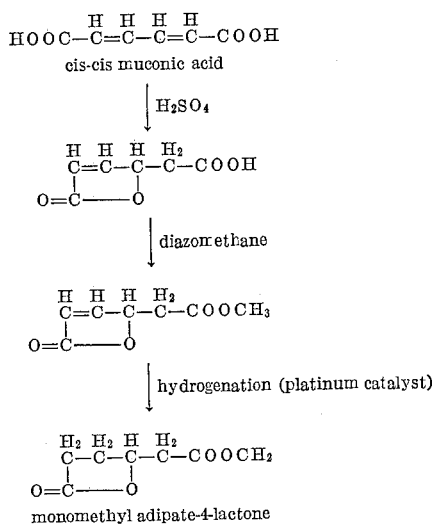

No process is available, however, for a one-step preparation of monoalkyl adipate-4-lactones.

This invention has as an object the preparation and isolation in pure form of monoalkyl adipate-4-lactones. A particular object is the preparation in one step and isolation in pure form of monoalkyl adipate-4-lactones from 1,4-dicyanobutene-1.

These objects are accomplished by the alcoholysis of 1,4-dicyanobutene-1 in acidic media to give a monoalkyl adipate-4-lactone and a small amount of cis-trans dialkyl-2,3-dihydromuconate,

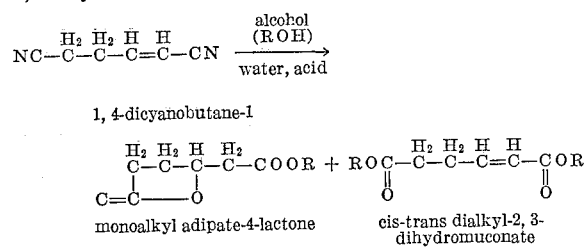

where R is an alkyl radical containing from one to four carbon atoms. The monoalkyl adipate-4-lactone is then isolated in pure form by standard techniques.

The process of the invention is carried out by admixing 1,4-dicyanobutene-1 with a mixture of an excess, based on 1,4-dicyanobutene-1, of an alkanol containing from one to four carbon atoms, of water, and of sulfuric acid and heating the agitated mixture under reflux at a temperature above 100° C. until substantially all of the 1,4-dicyanobutene-1 has been consumed.

The preparation of monoalkyl adipate-4-lactones by the process of the present invention involves a simultaneous hydrolysis, esterification and lactonization of the 1,4-dicyanobutene-1 molecule to yield the desired product. The reaction is carried out by the addition of refined 1,4-dicyanobutene-1 to an excess of a refluxing mixture of alkanol, water, and sulfuric acid in a suitable reaction vessel fitted with means to record temperatures, carry out agitation, and control the boiling.

The molar ratio of alkanol to 1,4-dicyanobutene-1 used in the initial reaction mixture is kept low, preferably 5/1 or less, with a ratio of about 3/1 being preferred. The lower ratios, particularly in the case of methyl and ethyl alcohol, allow higher reaction temperatures, and thus higher reaction rates to be obtained at atmospheric pressure. If higher molar ratios of alkanol to 1,4-dicyanobutene-1 are used, superatmospheric pressures can be employed to retain high reaction temperatures and rates.

The molar ratio of water to 1,4-dicyanobutene-1 can be varied from about 2/1 to 3/1. A molar ratio of sulfuric acid to 1,4-dicyanobutene-1 of 1/1 to 3/1 can be used with a ratio of 2/1 preferred.

The 1,4-dicyanobutene-1 used in the process of the present invention can be obtained from the base-catalyzed isomerization of 1,4-dicyanobutene-2. The resulting mixture, termed "refined 1,4-dicyanobutene-1" is composed largely of cis- and trans-1,4-dicyanobutene-1 and is a liquid boiling at 150° C./10 mm. Hereafter, the term "1,4-dicyanobutene-1" will be used to indicate "refined 1,4-dicyanobutene-1."

It has been found that when 1,4-dicyanobutene-2 is employed as a starting material in the acidic alcoholysis reaction, essentially all dialkyl-2,5-dihydromuconate is obtained,

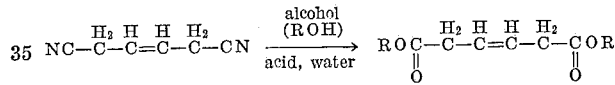

Thus, for the preparation of the lactone by the present process, the unsaturation in the 1,4-dicyanobutene molecule must be between the 1- and 2-carbon atoms.

The alcohols used in the process of the present invention are those having from one to four carbon atoms. Although higher alcohols may be employed, they are more readily utilized by reaction with one of the lower monoalkyl adipate-4-lactones (prepared by the process of this invention) to yield the desired product via ester interchange.

The addition of the 1,4-dicyanobutene-1 to the mixture of alcohol, water, and acid causes a temporary rise in reaction temperature eliminating the need for external heat. When the reaction subsides, the external heat is reapplied and the reaction is carried to completion at the reflux temperature of the mixture. The time required for most of the 1,4-dicyanobutene-1 to be converted will vary and may be as long as 24 hours, although in most cases, 4 to 5 hours is sufficient. Even after 24 hours, a small amount of unreacted 1,4-dicyanobutene-1 will remain in the reaction mixture.

The reflux temperature at atmospheric pressure will be dependent to a large degree upon the amount and type of alcohol present in the reaction mixture. As the alcohol is progressively consumed, particularly in case of the lower alcohols (methyl and ethyl), the reflux temperature will rise to as high as 150° C. At lower temperatures, e.g., 70–80° C., the reaction is slow and incomplete after several days. Lactonization does not appear to take place at an appreciable rate at the lower temperatures.

The course of the reaction may be followed conveniently by the use of infrared spectroscopy. Samples of the reaction mixture are taken periodically, washed with aqueous sodium bicarbonate solution, and subjected to infrared spectroscopic analysis. The absorbence of the characteristic nitrile band in the infrared spectrum and its rate of disappearance can be used as a quantitative reference point to determine the extent of the reaction. If necessary, during the course of the reaction, more water may be added to increase the reaction rate.

When the reaction is complete, the mixture is allowed to separate into two phases. It is important that the temperature of the reaction mixture remain well above room temperature, preferably 100° C. and higher, since the aqueous phase (lower) will solidify on cooling to room temperature due to crystallization of by-product ammonium bisulfate. The organic layer is seperated from the aqueous phase and the latter extracted with a suitable organic solvent. A preferable solvent for extraction is carbon tetrachloride; however, the aqueous phase should be cooled to less than 70° C. before extraction with this solvent is carried out. The extracts are combined with the organic phase and the resulting solution washed well with aqueous sodium bicarbonate solution and dried, for example, over anhydrous sodium sulfate. The resulting solution contains primarily the desired monoalkyl adipate-4-lactone and a much lesser amount of cis-trans dialkyl 2,3-dihydromuconate. The monoalkyl adipate-4-lactone can be conveniently isolated in pure form by fractional distillation of the solution under reduced pressure.

The distribution of reaction products can be varied depending upon the ratio of reactants and the reaction temperatures. Greater amounts of cis-trans dialkyl-2,3-dihydromuconate can be obtained by increasing the alcohol and decreasing the water content in the reaction mixture; however, as pointed out above, the use of large excesses of the lower alcohols results in a slower reaction rate.

The following examples serve to illustrate particular embodiments of this invention but are not intended to restrict the invention since obvious modifications would occur to one of skill in the art:

*Example I*

A solution of 32.0 g. (1 mole) of methyl alcohol, 19.1 g. (1.06 mole) of water, and 98.1 g. (1 mole) of sulfuric acid was well agitated in a 300 ml. round-bottom flask fitted with a thermometer, reflux condenser, heating mantle, and dropping funnel. The solution was heated to 85–90° C. and 53.1 g. (0.5 mole) of purified 1,4-dicyanobutene-1 added. The source of the heat was removed and the temperature of the reaction mixture rose to 118–120° over a period of 5–10 minutes. When the temperature dropped to 108–110° C., heating was resumed and the solution kept at reflux for 24 hours. The course of the reaction was followed by taking samples, washing the samples with aqueous sodium bicarbonate solution, and estimating the amount of unreacted 1,4-dicyanobutene-1 remaining by the infrared absorbence at 4.4 to 4.5μ attributed to the nitrile group. As the methyl alcohol was consumed, the reaction temperature rose to 125–130° C. Even after the 24 hours reaction time, there was still a small amount of unreacted 1,4-dicyanobutene-1 left in the reaction mixture.

The reaction mixture was allowed to cool to about 100° C. after which the organic layer (upper) was separated from the aqueous layer. The aqueous layer was cooled to about 70° C. and extracted with carbon tetrachloride and the carbon tetrachloride extract added to the organic layer. The organic layer was then washed with aqueous sodium bicarbonate solution, dried over sodium sulfate, and fractionated under reduced pressure in a spinning band column. The monomethyl adipate-4-lactone was collected at a temperature of 139–140° C. and a pressure of 5 mm. mercury. The yield to monomethyl adipate-4-lactone was 51.1%.

*Example II*

This reaction was carried out in the same manner as that described in Example I. Methyl alcohol, water, and sulfuric acid, in the approximate molar ratio of 3/2/2 were agitated and brought to reflux (98–105° C.). After the source of heat was removed, one mole of 1,4-dicyanobutene-1 per 3 moles of methyl alcohol was added in one portion causing the temperature to increase to 120–130° C. After the reaction subsided, the heat source was restored and the reaction mixture kept at 120–140° C. for 4–5 hours. One mole of additional water was added and the reaction continued for an additional hour. The agitation was stopped and the reaction mixture allowed to cool to about 100° C. The monomethyl adipate-4-lactone was isolated by the procedure described in Example I. A 50% yield of monomethyl adipate-4-lactone was obtained. The yield of by-product cis-trans dimethyl-2,3-dihydromuconate was 17%.

*Example III*

This example was carried out in the same manner as that of Examples I and II except that 74.1 g. (1 mole) of n-butyl alcohol was used in place of the methyl alcohol. A 26.5% yield of pure mono-n-butyl adipate-4-lactone, boiling at 122–124° C./0.35 mm., was obtained.

The process of this invention can be carried out in a continuous manner with continuous addition of reactants and continuous draw-off of product by allowing sufficient hold-up time to permit the substantial completion of the reaction. For example, the continuous process can be carried out in a series of stirred reactors with a hold-up time of 4 to 24 hours and with recirculation of the effluent from the last reactor to the first reactor, continuous draw-off of a portion of the recirculating mixture for product recovery, and continuous addition of reactants, in the proportions given herein, to the first reactor. In such a continuous system, the temperature of each reactor in the series should be higher than that of the previous reactor from the first to the last reactor. Usually from three to five reactors in a series is preferable. The method used to recover the product from the continuous draw-off is similar to that described above, viz., separation of the organic layer from the aqueous layer, and isolation of the monoalkyl adipate-4-lactone from the organic layer by fractional distillation.

Several physical constants were determined on the purified monomethyl adipate-4-lactone prepared by the process of the present invention and are listed below.

(1) Refractive index, $N_D^{25}$ _____ 1.4570
(2) Density at 25° C. _____ 1.198
(3) Molar refractivity:
    (a) Determined from constants _____ 35.63
    (b) Calculated _____ 35.81
(4) Saponification equivalent:
    (a) Determined _____ 78.9
    (b) Calculated _____ 79.0
(5) Surface tension, dynes/cm. _____ 44.4
(6) Parachor:
    (a) Determined from constants _____ 339.5
    (b) Calculated from surface tension _____ 339.7

The monoalkyl adipate-4-lactones are useful as modifiers and plasticizers for plastics. They can also be used as monomers and comonomers in polymerization reactions. For example, polymerization of monomethyl adipate-4-lactone by reaction with hexamethylenediamine yields tacky, glasslike polymers, suitable for adhesives.

I claim:

1. A process for the preparation of a monoalkyl adipate-4-lactone, in which the alkyl group contains from one to four carbon atoms, by admixing 1,4-dicyanobutene-1 with a mixture of an excess, based on 1,4-dicyanobutene-1, of an alkanol containing from one to four carbon atoms, of water, and of sulfuric acid and heating the agitated mixture under reflux at a temperature above 100° C. until substantially all of the 1,4-dicyanobutene-1 has been consumed.

2. A continuous process for the preparation of a monoalkyl adipate-4-lactone, in which the alkyl group contains from one to four carbon atoms, by continuously admixing 1,4-dicyanobutene-1 with a mixture consisting of an excess, based on 1,4-dicyanobutene-1, of an alkanol containing from one to four carbon atoms, of water, and of sulfuric acid and continuously adding said mixture to a reacting mixture of said ingredients maintained at a temperature above 100° C., passing the reacting mixture through a series of progressively changing environments of increasing temperature, and returning the reaction mixture to the first environment and temperature while drawing off a portion therefrom at a rate such that the average hold-up time is from 4 to 24 hours, and recovering the monoalkyl adipate-4-lactone from the organic layer portion of the reaction mixture drawn off.

3. A process for the preparation of monoalkyl adipate-4-lactones which comprises the addition of one molar equivalent of 1,4-dicyanobutene-1 to a stirred mixture of an excess of alkanol, said alkanol selected from the class consisting of alkanols having from one to four carbon atoms, of water, and of sulfuric acid in molar ratios of 1 to 5, 2 to 3, and 1 to 3, respectively, heating the reaction mixture at 100°–150° C. for a period of 4 to 24 hours, separating the organic phase from the aqueous phase, and isolating the monoalkyl adipate-4-lactone from the organic phase by fractional distillation under reduced pressure.

4. A continuous process for the preparation of monoalkyl adipate-4-lactones which comprises the continuous addition of one molar equivalent of 1,4-dicyanobutene-1 to an agitated mixture of an excess of alkanol, said alkanol selected from the class consisting of alkanols having from one to four carbon atoms, of water, and of sulfuric acid in molar ratios of 1 to 5, 2 to 3, and 1 to 3, respectively, maintaining the reaction mixture at a temperature of 100 to 150° C., passing the reaction mixture through a series of progressively changing environments of increasing temperature, and returning the reaction mixture to the first environment and temperature while drawing off a portion therefrom at a rate such that the average hold-up time is from 4 to 24 hours, and recovering the monoalkyl adipate-4-lactone from the organic layer portion of the reaction mixture drawn off.

5. The process according to claim 3 wherein one molar equivalent of 1,4-dicyanobutene-1 is added to the alkanol, water, sulfuric acid mixture present in a molar ratio of 3/2/2.

6. The process according to claim 3 wherein the alkanol is methyl acohol.

7. The process according to claim 3 wherein the alkanol is n-butyl alcohol.

8. A process for the preparation of monomethyl adipate-4-lactone which comprises the addition of one molar equivalent of 1,4-dicyanobutene-1 to a stirred mixture of methanol, water, and sulfuric acid in a molar ratio of 3/2/2, heating the reaction mixture at 100–150° C. for a period of 4 to 24 hours, separating the organic phase from the aqueous phase, and isolating the monomethyl adipate-4-lactone from the organic phase by fractional distillation under reduced pressure.

No references cited.

ALEX MAZEL, *Primary Examiner.*

JOSEPH A. NARCAVAGE, *Assistant Examiner.*